Jan. 15, 1963   J. T. MULLER   3,073,148
METHOD AND APPARATUS FOR CONTROLLED MOTION SHOCK TESTING
Filed Jan. 6, 1958   9 Sheets-Sheet 1

FIG. 1

INVENTOR.
JOHN T. MULLER
BY
MORGAN, FINNEGAN, DURHAM & PINE
his Attorneys

INVENTOR.
JOHN T. MULLER
BY
MORGAN, FINNEGAN, DURHAM & PINE
his Attorneys

Jan. 15, 1963 J. T. MULLER 3,073,148
METHOD AND APPARATUS FOR CONTROLLED MOTION SHOCK TESTING
Filed Jan. 6, 1958 9 Sheets-Sheet 7

INVENTOR.
JOHN T. MULLER
BY
MORGAN, FINNEGAN, DURHAM & PINE
his Attorneys

Jan. 15, 1963   J. T. MULLER   3,073,148
METHOD AND APPARATUS FOR CONTROLLED MOTION SHOCK TESTING
Filed Jan. 6, 1958   9 Sheets-Sheet 8

INVENTOR.
JOHN T. MULLER
BY
MORGAN, FINNEGAN, DURHAM & PINE
his Attorneys

United States Patent Office 3,073,148
Patented Jan. 15, 1963

3,073,148
METHOD AND APPARATUS FOR CONTROLLED
MOTION SHOCK TESTING
John T. Muller, 50 W. Lawn Road, Livingston, N.J.
Filed Jan. 6, 1958, Ser. No. 707,218
19 Claims. (Cl. 73—12)

The invention relates to shock testing methods and apparatus therefor and more particularly to a method and apparatus in which the shock motion imparted to the object may be accurately controlled and readily duplicated.

The art of shock testing is a new art, relatively speaking. Its first significant development came in the early days of World War II and stemmed from the attempts of our armed forces to devise apparatus and test procedures which could be used to subject arms and materiel to the type of shocks which they would receive in combat. Out of these early attempts first came what is known as the "hammer" type of testing apparatus. In this type of apparatus a heavy weight is mounted on the end of a pivotable arm and the object to be tested is secured to a platform. The arm is then raised to various heights and permitted to fall freely against the platform on which the object is mounted thus transmitting to the test object through the platform an impulse that sets the object in motion and subjects it to a shock. Suitable means are provided for arresting the motion of the platform and for returning it to its original position. A second type of shock testing apparatus developed from attempts to overcome breakage encountered in the handling of expensive, but fragile, wartime apparatus. In the technique employing this type of apparatus—called the drop test—the object to be tested is placed on a platform, raised to a selected height and dropped into some sort of yielding substance, such as sand or some other like material. In a variation of this apparatus the platform is provided with a spring and is allowed to drop against an anvil, the spring serving as the yielding element by its compression upon engagement with the anvil. Still another type of testing apparatus utilized is that in which the object is set in motion through the expansion of a gaseous medium. In one form the object may be placed on a sled or carriage mounted on rails and then accelerated by jet propulsion of the sled. In another form a piston-like carriage is mounted within a closed tube and gas under high pressure is introduced into one end of the tube causing the piston on which the object is mounted to rapidly accelerate and move toward the opposite end of the tube. The carriage is stopped by the increase in pressure built up in the opposite end of the tube as the carriage approaches.

All of the foregoing methods and apparatus have serious disadvantages which, to date, have limited their utility. The "hammer" type equipment is very crude and permits no control over the extremely quick transfer of energy imparted by the hammer to the platform on which the object is mounted. Furthermore, it is impossible to obtain any reproducibility in such equipment because the shock imparted by successive blows of the hammer varies constantly. This type of test is also very inaccurate in that the construction of the platform on which the object is mounted greatly influences the type of impact transmitted to the object. In most cases the displacement of this type of apparatus is very great and the apparatus does not lend itself to the testing of anything other than large objects. The drop test method also has serious drawbacks that limit its utility. The test fails to provide any effective control over the type of shock imparted to the object due to the many variable factors involved, such as the variations in the yieldability of the sand, and the position of the test object during its free fall. For these reasons the same type of shock can never be duplicated. Another serious drawback is that the test requires a large displacement of the object in order to achieve the necessary velocity. This is particularly disadvantageous because of recent trends in test procedures which require the object to be monitored during the test. As for the apparatus in which the object is accelerated by the expansion of a gas, this apparatus is extremely expensive due to the large quantities of gas required and the extensive structures involved. Additional drawbacks are that large displacements are necessary and only one general type of shock pattern can be obtained.

The present invention has for its object the provision of a method and apparatus for shock testing objects which will not be subject to the disadvantages of the prior known testing methods discussed above. More particularly, the invention has among its objects the development of a method and apparatus for shock testing objects capable of producing and imparting any desired type of shock pattern to the object. Furthermore, it is also an object of the invention to develop such a method and apparatus which will be able to repeatedly reproduce the same shock pattern indefinitely. The invention also has for its object the development of a method and apparatus for shock testing which are simple and easily utilized and inexpensive to build and employ. Still another object of the invention is to provide such a method and apparatus having minimal space requirements and the capacity to test both large and small objects. It is also an object of the invention to provide such a method and apparatus which will require very little displacement of the object being tested.

The present invention is a result of a new approach toward shock testing. At the present time the drop test and hammer type apparatus described above are the most widely used types of apparatus in this field. The hammer type apparatus is used only when the shock is of extremely short duration—in the order of two or three milliseconds. By and large the most widely used test method is the drop test. Since this test offers no control over the type of shock pattern transmitted to the object it has become customary in the field to state test specifications only in terms of the peak acceleration value and the time duration of the shock impulse. With these values known the usual procedure is to assume a sinusoidal contour for the impulse and then to calculate the terminal velocity which such an impulse would impart to the test object. Once the terminal velocity is known the height from which the object must be dropped can be determined and other conditions of the test can be set up to approximate the time duration.

While this procedure assumes a particular type of contour of the shock impulse in order to arrive at the necessary test data there is no correlation between this impulse contour and the actual contour of the impulse which the object will meet in its application. The latter, as illustrated hereinafter, may be a non-sinusoidal complex wave such as is formed of a fundamental sinusoid and plurality of harmonics. The sinusoidal contour is assumed because it roughly approximates the contour of the impulse imparted in a drop test.

Because of the present inability of known methods to reproduce the contour of shock impulse which the test object will encounter in its application little consideration has heretofore been given to shock impulse contours. However, the desirability of subjecting the object to a test shock impulse closely akin in intensity, duration and contour to that expected in service has, of late, been increasingly appreciated. The applicant's invention is, in part, based upon the conception that this important factor, heretofore neglected in prior known testing devices, namely, the contour of the shock impulse expected in service, can be utilized as the key by which there may be developed a testing method and apparatus therefor capable of producing a test shock impulse of the same intensity, time duration and contour as the shock impulses expected in service. Applicant's invention is also based in part upon the appreciation that since acceleration is the second derivative of displacement the proper displacement of the test object required to subject the object to the desired shock impulse can be obtained by twice integrating the desired shock impulse curve, as this is an acceleration curve.

Briefly, and in general, applicant's method comprises subjecting the test object to a predetermined displacement motion that will have at least two impulses—the desired shock impulse and a second impulse, opposite in direction and of lesser intensity but equal to the shock impulse in energy content. In such a situation the test object will not be returned to its original starting position but will have travelled from original point A to some spaced point B. Preferably, the test object is subjected to a displacement motion having the desired shock impulse and two opposite impulses of lesser intensity, the sum of whose energies are equal to that of the shock impulse. With the shock impulse interposed between the two opposite impulses the test object will travel from point A to point B and then back again to rest at point A. While the intensity of the two opposite impulses is substantially less than that of the shock impulse their time duration is longer. Although not essential it is preferable that the magnitude of the two opposite impulses be constant. These opposite impulses thus have the effect of subjecting the test object to a constant artificial gravitational field. The displacement motion of the test object is obtained from a displacement curve which is the result of twice integrating the curve of the shock impulse and the two (or one) opposite impulses.

Applicant's preferred apparatus for carrying out his method, briefly and generally, comprises data storage means for defining the desired displacement motion for the test object with suitable motion translating mechanism connected between the displacement motion defining means and a movable support upon which the test object is secured. Stored energy in convenient form is provided on the apparatus and is connected to the motion translating mechanism and controls are provided for releasing the stored energy at the proper time to actuate the motion translating mechanism so as to convert the defined displacement motion into unidirectional and, if two opposite impulses are provided, into reciprocal movement of the support and test object.

It will be understood that the foregoing general description and the following detailed description as well are exemplary and explanatory of the invention but are not restrictive thereof.

Figure 19:
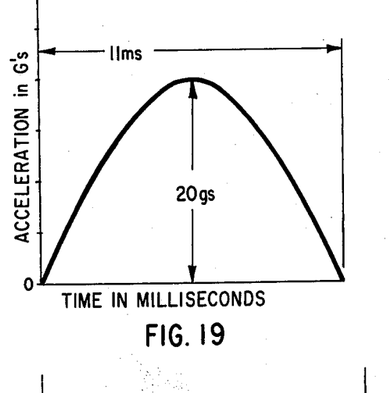
FIGS. 19–23 are graphs illustrating the principles underlying applicant's invention.

In order to properly understand applicant's novel method and apparatus it is necessary to understand certain fundamentals relating to shock motion. Shock is transient motion during a time interval which impulse is that which produces the transient motion. A shock pattern, therefore, can be represented pictorially by plotting the acceleration values of the shock-producing impulse against time. Thus a sinusoidal shock curve having a peak acceleration value of 20 $g$'s and a time duration of 11 milliseconds may be represented as a trigonometric function such as in FIG. 19.

Figure 20:
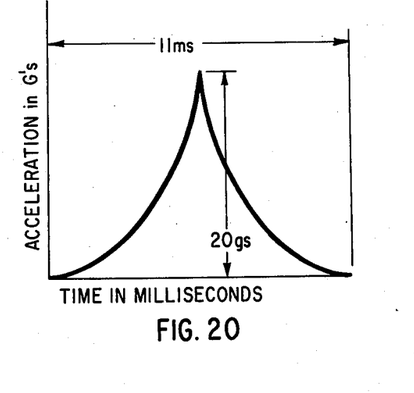

Inasmuch as the terminal velocity of the shock impulse is indicative of the energy of the shock and is proportional to the area under the curve it will be seen that the contour of the shock impulse curve is important, since any changes in the contour which change the area under the curve will vary the terminal velocity and hence the energy of the impulse. For example, if the contour of the shock impulse curve were complex such as shown in FIG. 20 the peak acceleration of 20 $g$'s and the impulse time duration of 11 milliseconds would be the same as in the first example but the severity of the shock would be much less because the terminal velocity and energy imparted to the test object would be very much less. At the present time there is no prior apparatus or method available that will give control over the contour of the test shock impulse curve.

The present invention is based upon the realization that a complete shock impulse curve—which is an acceleration curve—provides the means by which the desired displacement motion of the test object may be obtained. This is because acceleration is the second derivative of displacement. Once the shock impulse curve is defined in terms of peak acceleration value, time duration and contour an equation for the curve may be determined. By integrating this equation twice the equation for the displacement curve which will impart the desired shock impulse to the test object is obtained. Before this can be done, certain additional factors must be taken into consideration and certain additions must be made to the shock impulse curve before it is integrated.

If an object at rest at point A is to be moved to, and brought to rest at, a spaced point B two impulses are required; one to set the object in motion and a second equal and opposite impulse to arrest the motion of the object in order to bring it to rest at point B. If it is desired to move an object at rest from point A to point B and back to rest at point A three impulses are required; one to set the object in motion, a second opposite impulse to arrest the motion at point B and to send it in motion toward point A and a third impulse to arrest the motion of the object and to bring it to rest at point A. If no consideration is given to these facts and only the shock impulse curve is integrated the resultant displacement curve for the test object will leave the object with a terminal velocity. In other words the object would fly off its platform. Accordingly, if the test object is to be moved from point A to point B and back to point A again two equal and opposite impulses must be incorporated and the energy of the two impulses must be equal to the energy of the shock impulse.

Figure 21:
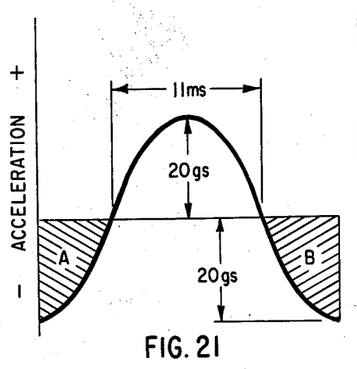

If the time duration and contour of the two opposite impulses are made the same as the shock impulse the peak values of these impulses will be equal to that of the shock impulse and the object will receive three test shocks of the same peak value instead of only one. This is shown in FIG. 21.

In such a case the test obviously would be more severe than required. Since the time duration and contour of these opposite impulses are not important from a test point of view they can be varied so as to bring the test object to rest without subjecting the object to a more severe test than is required.

Figure 22:
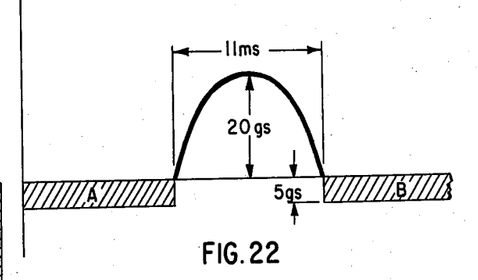

Accordingly, the time duration of the opposite impulses in the applicant's method is increased and their contours preferably changed to rectangular curves. The effect of this is to reduce the peak value of the curves, said value depending upon the selected time duration of these impulses. This is illustrated in FIG. 22.

Figure 23:
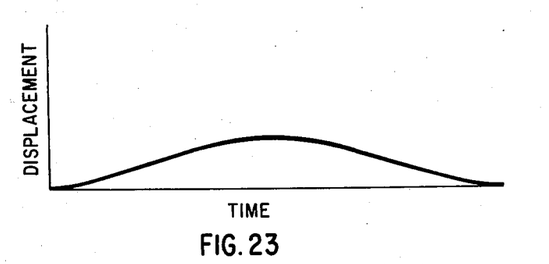

By stretching out the time duration of impulses A and B and making the contour of these curves rectangular the peak values of the impulses are reduced to a point where they are unimportant from a test point of view since an object designed to withstand an impulse of 20 g's can obviously withstand an impulse of 4 or 5 g's. With the shock impulse curve thus modified by the addition of these impulses, the equation of the resultant curve is then determined and integrated twice to obtain the equation of the corresponding displacement curve. Such a displacement curve for the impulse curve above is shown in FIG. 23.

The contour of this displacement curve will have the desired shock impulse characteristics and when applied to the test object will bring the object back to rest in its original position. Once the displacement curve has been determined it is translated into unidirectional movement of the test object.

Figure 1:
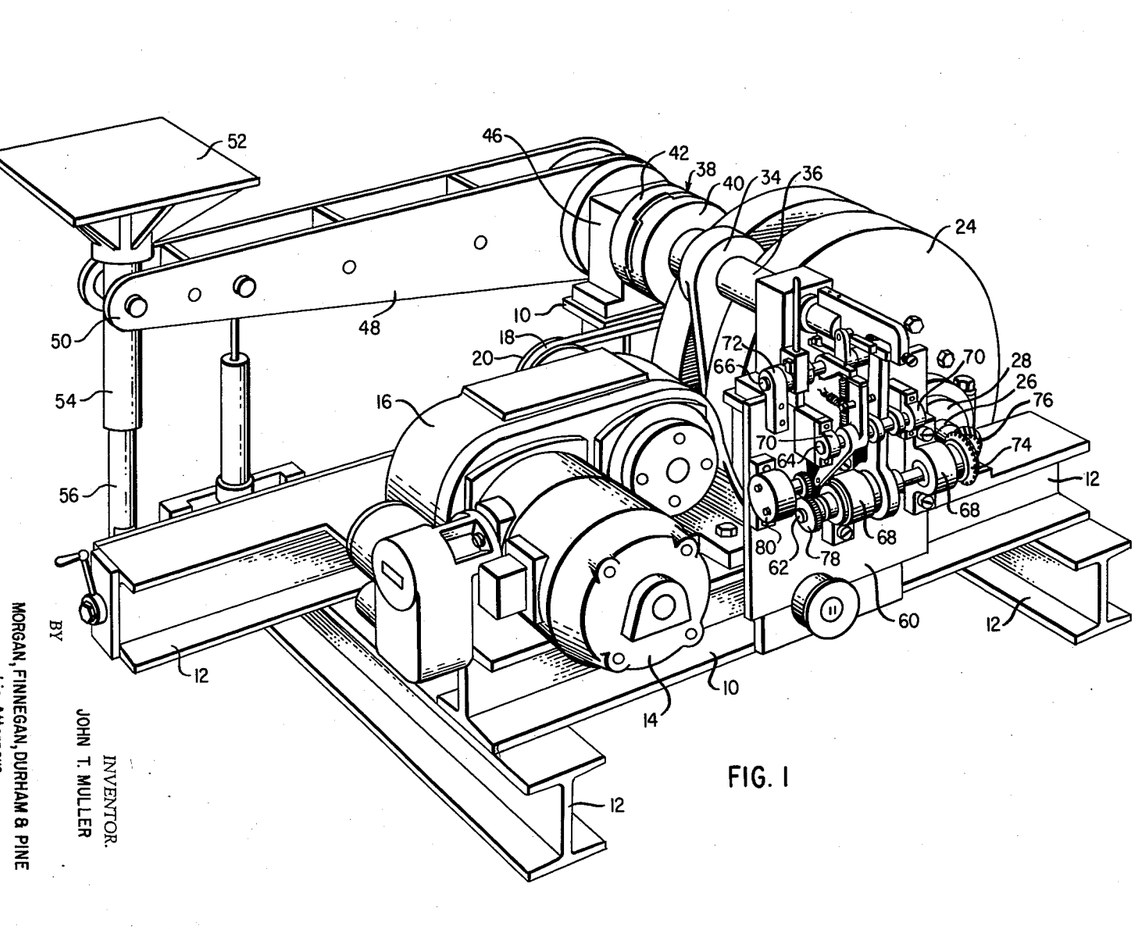
FIG. 1 is a perspective view of a preferred apparatus for carrying out applicant's method.
Figure 3:
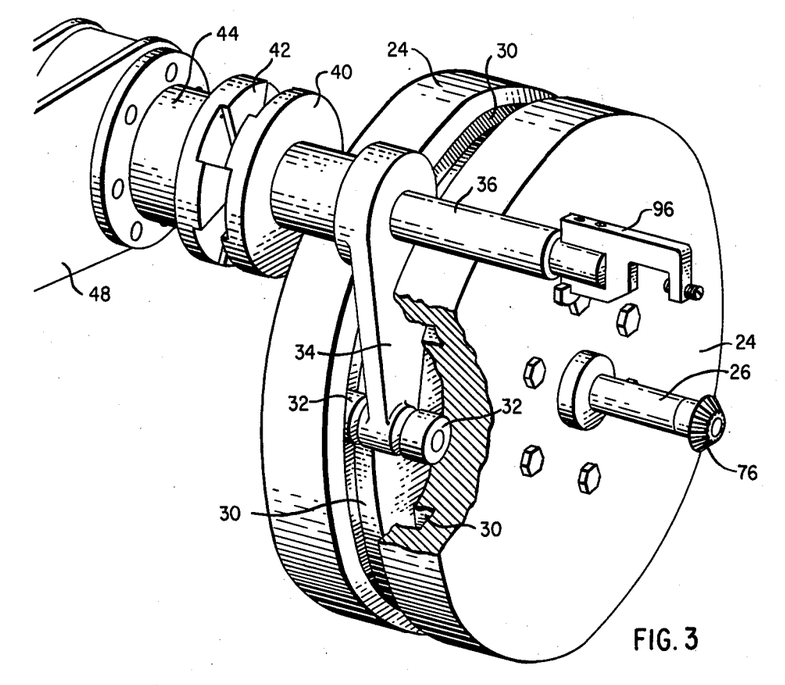
FIG. 3 is a perspective view, partly in section, showing a portion of applicant's preferred apparatus.
Figure 4:
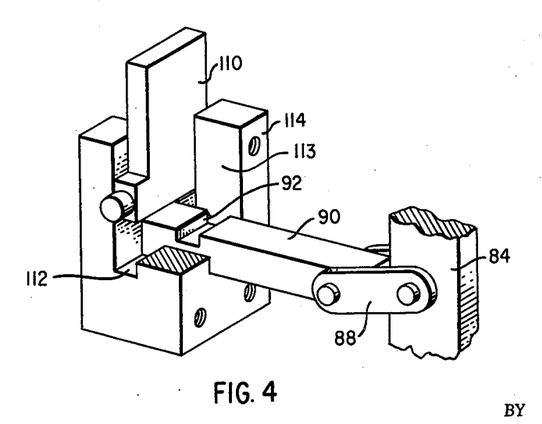
FIG. 4 is a perspective view showing a detail of the apparatus.

A preferred form of applicant's test apparatus is shown in the drawings. Referring first to FIG. 1 there is shown a frame 10 for the apparatus constructed from I-beams 12 welded together and preferably imbedded in concrete (not shown). Mounted at the front of the frame is the driving motor 14 therefor and its associated speed reducer mechanism 16. The driving motor 14, through a flexible driving belt 18 and suitable pulleys 20, 22 therefor, serves to drive a pair of large rotary flywheels 24 mounted for rotation on a shaft 26 journalled in bearing blocks 28 secured to the frame 10. The flywheels 24 are mounted in parallel spaced relationship and have formed in their inner faces duplicate corresponding cam tracks 30. (Partially shown in FIG. 3.) For the most part the cam tracks 30 are circular in configuration but a portion of each cam track is shaped to form the displacement motion required to subject the test object to the desired shock impulse and the traces accordingly serve as data storage means in which the required displacement-versus-time data are programmed.

Suitable tracking means in the form of dual cam followers 32 mounted on the end of a large lever arm 34 are provided, the lever arm 34 being fixedly secured to a longitudinally movable oscillatory shaft 36. At one end of the oscillatory shaft 36 there is provided a clutch 38, one face 40 of which is secured to and movable with the oscillatory shaft, the other face 42 being mounted on a short shaft 44 journalled in a bearing housing 46 on the frame 10. The shaft 44 is fixedly secured to a long pivotable arm 48 so that oscillation of the shaft 44 results in pivotable movement of the arm. At its outer end 50 the arm 48 carries a supporting surface or platform 52 to which the test object is secured. The platform 52 is arranged so as to travel only in a vertical direction and is, for this purpose, secured to a casing 54 slidably mounted on a vertical guide member 56 fixed to the frame 10.

The control mechanism for the apparatus is shown in FIG. 1 mounted on a control panel 60 at the front of the frame 10. Details of the mechanism are shown in FIGS. 4-15. The controls are generally arranged on three parallel control shafts 62, 64, 66 journalled in bearing blocks 68, 70, 72 mounted on the panel 60. The lowermost shaft 62 carries a bevel gear 74 at one end which meshes with a similar bevel gear 76 mounted on the end of the shaft 26 for the rotary flywheels 24. These gears serve to transmit the rotation of the shaft 26 to the lowermost control shaft 62. At the end opposite the bevel gear 74 the control shaft 62 carries a driving gear 78 that serves to drive a tachometer 80 by means of which the r.p.m. of shaft 26 is indicated. Also mounted on the control shaft 62 is an eccentric disc 82 and a partial cam 85. The eccentric disc 82 serves to drive a lever arm 84 and for this purpose the lever arm 84 is provided with an enlarged annular boss 86 which fits over the disc 82. Lever arm 84 is connected by a link 88 adjacent its mid-portion to a slidable bolt 90 having a notch 92 in its upper surface. At its upper end, the lever arm 84 fits within a recess 94 formed in an extension plate 96 fixed to the end of the oscillatory shaft 36.

Figure 5:
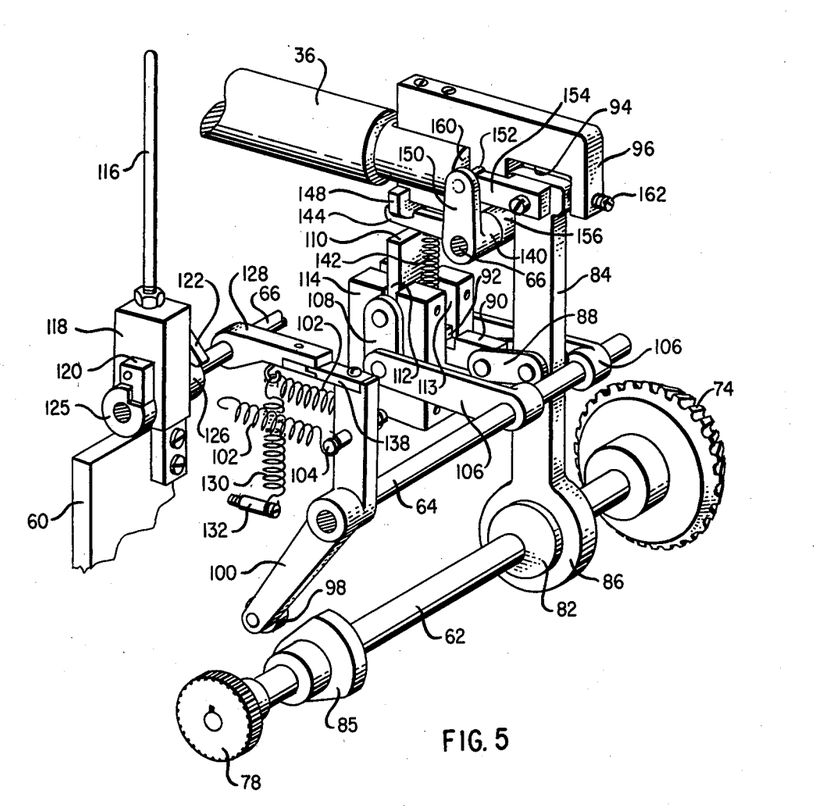
FIG. 5 is a perspective view showing the general organization of the control mechanism for applicant's apparatus.
Figure 6:
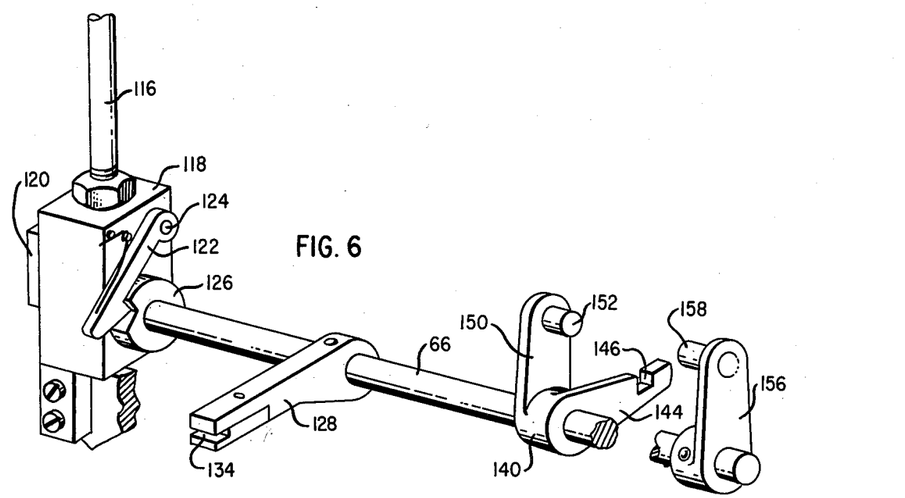
FIG. 6 is a perspective view of a detail of the applicant's control mechanism.
Figure 7:
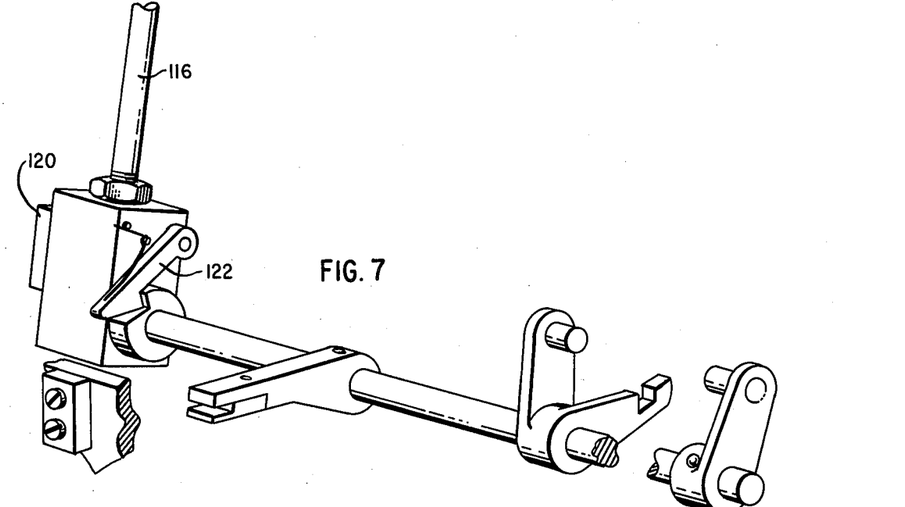
FIG. 7 is a view similar to that of FIG. 6 showing the mechanism in a different position.
Figure 8:
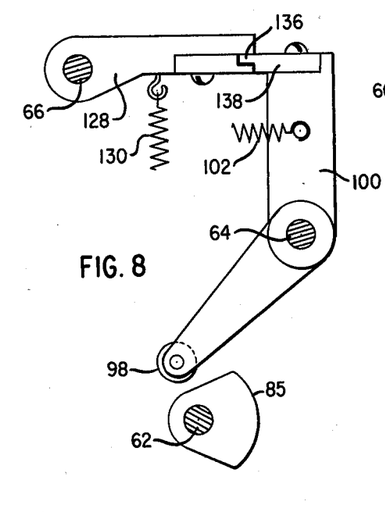
FIGS. 8–11 are sequential views showing the operations of a detail of applicant's control mechanism.
Figure 9:
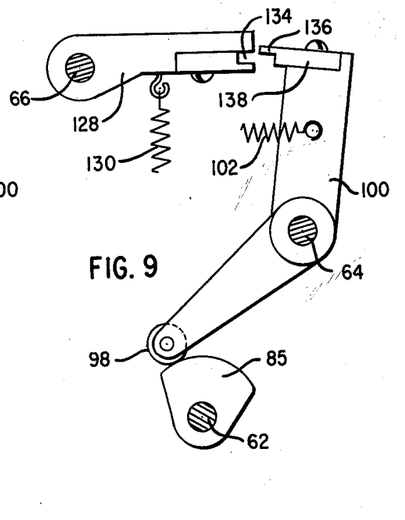
Figure 10:
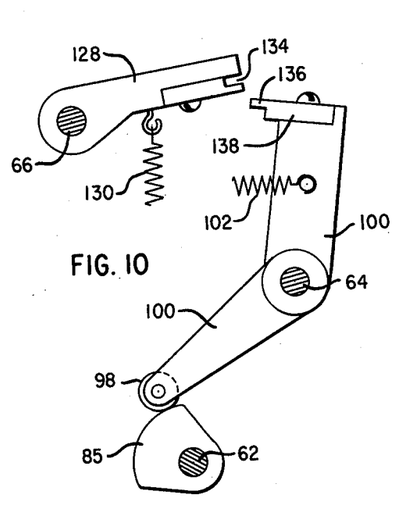
Figure 11:
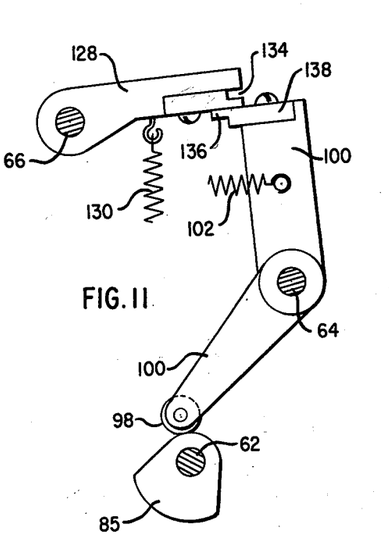
Figure 12:
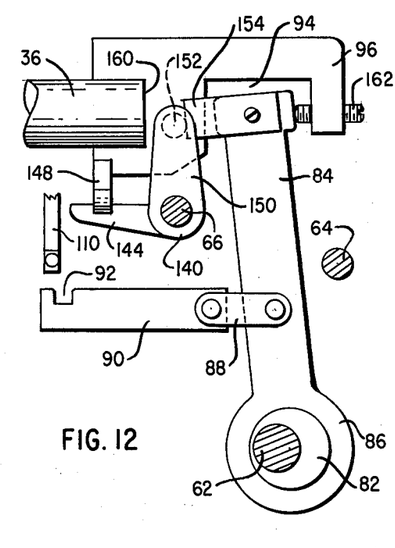
FIGS. 12–15 are sequential views showing another detail of applicant's control mechanism.
Figure 13:
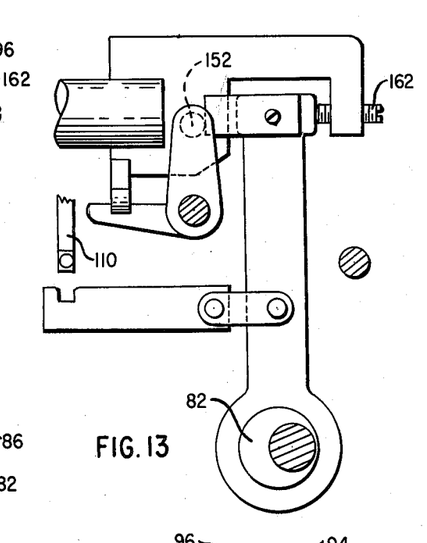
Figure 14:
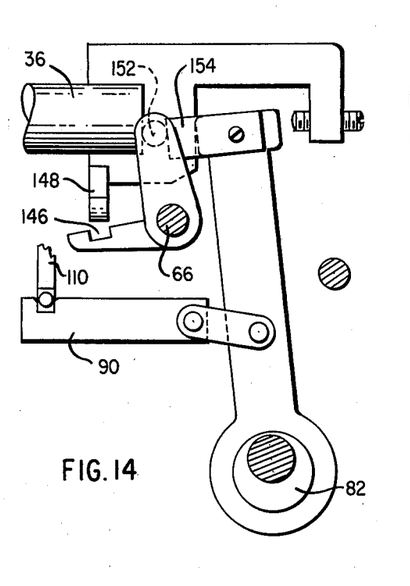
Figure 15:
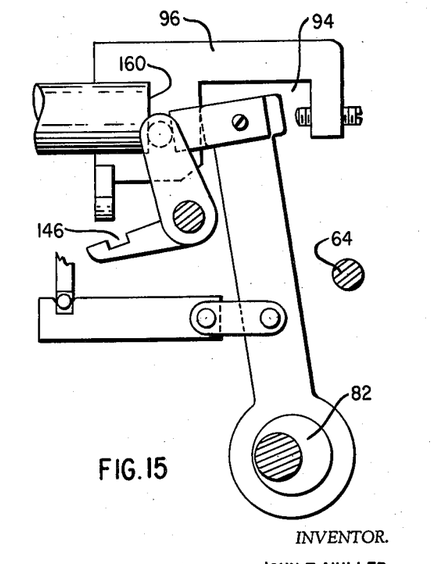

The partial cam 85 is positioned on control shaft 62 so as to intermittently engage a cam follower 98 mounted at one end of a bell crank 100 fixedly secured to the middle control shaft 64. The bell crank 100 is constantly urged in a counterclockwise direction (as shown in FIG. 5) by a pair of springs 102 secured to the control panel 60 and to a pin 104 mounted in the upper arm of the bell crank 100. Middle control shaft 64 also carries a pair of inwardly extending arms 106 fixedly mounted thereon and connected at their free ends by means of intermediate links 108 with a gib 110 vertically movable within a guideway 112 formed in a block 114. The block 114 is also provided with an intersecting guideway 113 for the slidable bolt 90 and the bolt 90 and the gib 110 are normally positioned so as to bring the notch 92 in the upper surface of the slidable bolt 90 underneath the gib 110 during the movement of the lever arm 84, but interlocking engagement is prevented because the arms 106 hold the gib 110 out of engagement.

The uppermost control shaft 66 has mounted thereon the starting handle 116 by which the operator may set the control mechanism in motion. The handle itself extends from a box 118 loosely mounted on the shaft 66 and carries on opposite sides a pair of pawls 120, 122 fixedly secured to the same shaft 124 so as to be movable together. The left-hand pawl 120 (as shown in FIG. 5) engages a stationary stepped collar 125 while the pawl 122 engages a similar collar 126 fixed to the shaft 66. Control shaft 66 also carries a lever 128 which is fixed to the shaft and which is constantly urged in a clockwise direction (as shown in FIG. 5) by a spring 130 secured to the lever 128 and a pin 132 on the control panel 60. At its outer end the lever 128 is provided with a groove or recess 134 which is adapted to receive a correspondingly shaped extension 136 on a smaller lever 138 secured to the top of the bell crank 100 on the middle control shaft 64. When the extension 136 on the lever 138 engages the groove 134 in the lever 128 the upper and middle control shafts 66, 64 respectively, are locked together. The control shaft 66 also carries a small bell crank 140 loosely mounted thereon which is constantly urged in a clockwise direction (as shown in FIG. 5) by a spring 142 interposed between the inwardly extending arm 144 of the bell crank 140 and the guide block 114. Toward its outer end the inwardly extending arm 144 is provided with a notch 146 in the upper surface thereof which engages with a gib 148 fixed to the inner edge of the extension plate 96 for the shaft 36. Adjacent the outer end of the opposite or upwardly extending arm 150 of the bell crank 140 is a pin 152 which engages a guide plate 154 secured to the upper end of the lever 84. Immediately adjacent bell crank 140 there is fixedly secured to the shaft a lever 156 having a pin 158 adjacent its outer end to engage the outer end 160 of the shaft 36.

The normal non-actuating position of the control mechanism is shown in FIG. 5. While the controls are in position shown in this figure rotation of the flywheels 24 on the shaft 26 will result in rotation of the lowermost control shaft 62 through the bevel gears 76 and 74. Rotation of this control shaft will, in turn, result in intermittent engagement of the partial cam 85 with the cam follower 98 and, due to the rotation of the eccentric 82 within the opening in the annular boss 86, in oscillation of the lever arm 84. Since the upper end of the lever arm 84 is secured within the recess 94 of the extension plate 96 by means of a set screw 162 oscillation of the lever arm also produces a pivoting of the arm about its upper end. This pivotal motion of the lever arm 84 causes the slidable bolt 90 to be moved inwardly and outwardly of the guideway 113 in the block 114.

When it is desired to actuate the control mechanism so as to connect the rotary flywheels 24 through the various motion translating mechanisms with the test platform 52 the operator moves the handle 116 in a counterclockwise direction (as shown in FIG. 5). Movement of the handle 116 and the handle box 118 causes the pawl 122 to rotate collar 126 and the uppermost control shaft 66, since the collar 126 is fixedly secured thereto. However, such movement of the handle 116 and the control shaft 66 must only take place at the proper time with respect to the cycle of operation. Accordingly, the shaft 66 is normally locked with control shaft 64 by means of the levers 128 and 138. Thus, the operator must maintain his hand on the handle 116 until the partial cam 85 has engaged cam follower 98 and has pivoted bell crank 100 and its upper lever 138 out of engagement with lever 128. When this has taken place there is no longer any resistance to the movement of the handle 116 and the operator can move it through its actuating stroke.

With the lever 128 disengaged from lever 138 and after the partial cam 85 has completed its camming action the springs 102 rotate the bell crank 100 and the middle control shaft 64 in a counterclockwise direction thereby moving the arms 106 downwardly to drop the gib 110 into the notch 92 of the slidable bolt 90. As the handle 116 nears the completion of its stroke the left-hand pawl 120 (as shown in FIG. 5) moves out of engagement with the stationary collar 125 and, at the same time, disengages the pawl 122 from the collar 126. Control shaft 66 is then returned in a clockwise direction by the spring 130 until the under surface of the lever 128 engages the upper surface of the lever 138 (see FIGS. 8–11).

With the sliding bolt 90 now locked against movement by the gib 110 the lever arm 84 pivots about its center. Rotation of the eccentric disc 82 in the annular boss 86 causes the upper end of the lever arm to move inwardly toward the shaft 36. As it moves inwardly the guide plate 154 rotates the small bell crank 140 because of its engagement with the pin 152 thereby disengaging the arm 144 and notch 146 from the gib 148. Thereafter, further inward movement of the lever arm 84 moves the pin 152 into engagement with the end face 160 of the shaft 36 and moves the shaft longitudinally to engage the clutch faces 40 and 42. As the eccentric disc 82 moves the lever arm 84 outwardly on its return stroke the clutch faces 40 and 42 are disengaged. Since the in and out movement of the lever arm 84 is accomplished in one revolution of the eccentric disc 82 it will be seen that the test object receives only one shock. When the partial cam 85 again engages cam follower 98, bell crank 100 and the control shaft 64 are rotated in a clockwise direction and gib 110 is raised out of engagement with the notch 92 in the slidable bolt 90. With the gib 110 disengaged from the bolt 90 the pivot point of the lever arms reverts to its upper end and the control mechanism is, therefore, returned to its non-operating position. Once the partial cam 85 has completed its camming action the levers 138 and 128 again become engaged and the cycle of control is completed.

Figure 2:
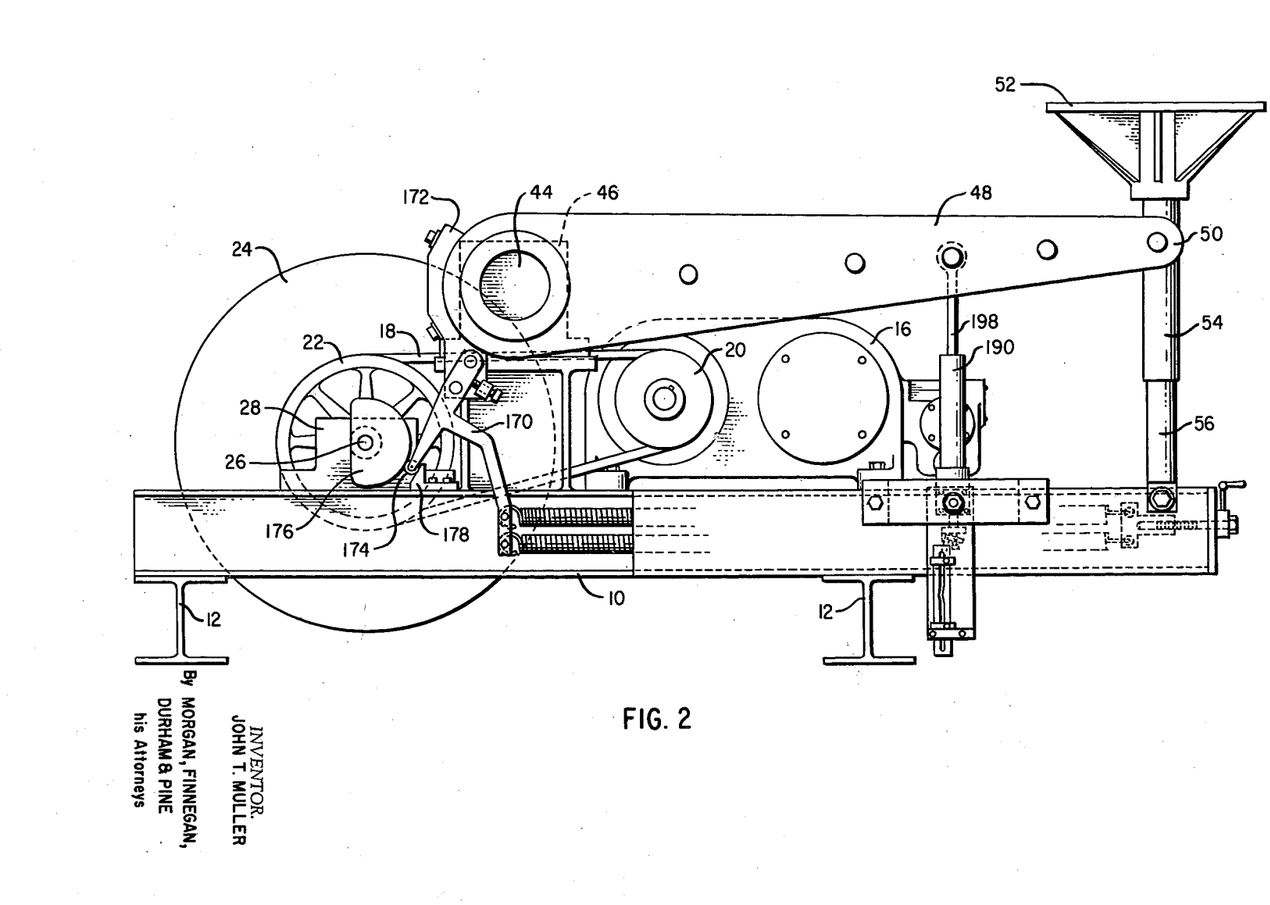
FIG. 2 is an elevational view showing the back of the apparatus shown in FIG. 1.

In order to maintain the arm 48 in its proper position during the short interval of time between the engagement of the clutch faces 40 and 42 and the oscillation of the shaft 36 there is provided at the back of the apparatus (see FIG. 2) a spring loaded lever 170 mounted on a bracket 172 fixedly secured to the pivot arm 48. The lever arm 170 is provided with a cam follower 174 at an outer end and this follower is mounted between a half circle cam 176 secured on the shaft 26 and a stationary cam member 178 secured to the frame 10. The half cam 176 is so positioned on the shaft 26 that during the short interval of time during which the arm 48 is unloaded the lever 170 is maintained between the cam and the stationary cam member, but when the oscillatory shaft 36 starts to move the arm 48 the cam releases the lever arm so as to permit the downward pivoting of the arm 48.

Figures 16, 17, 18:
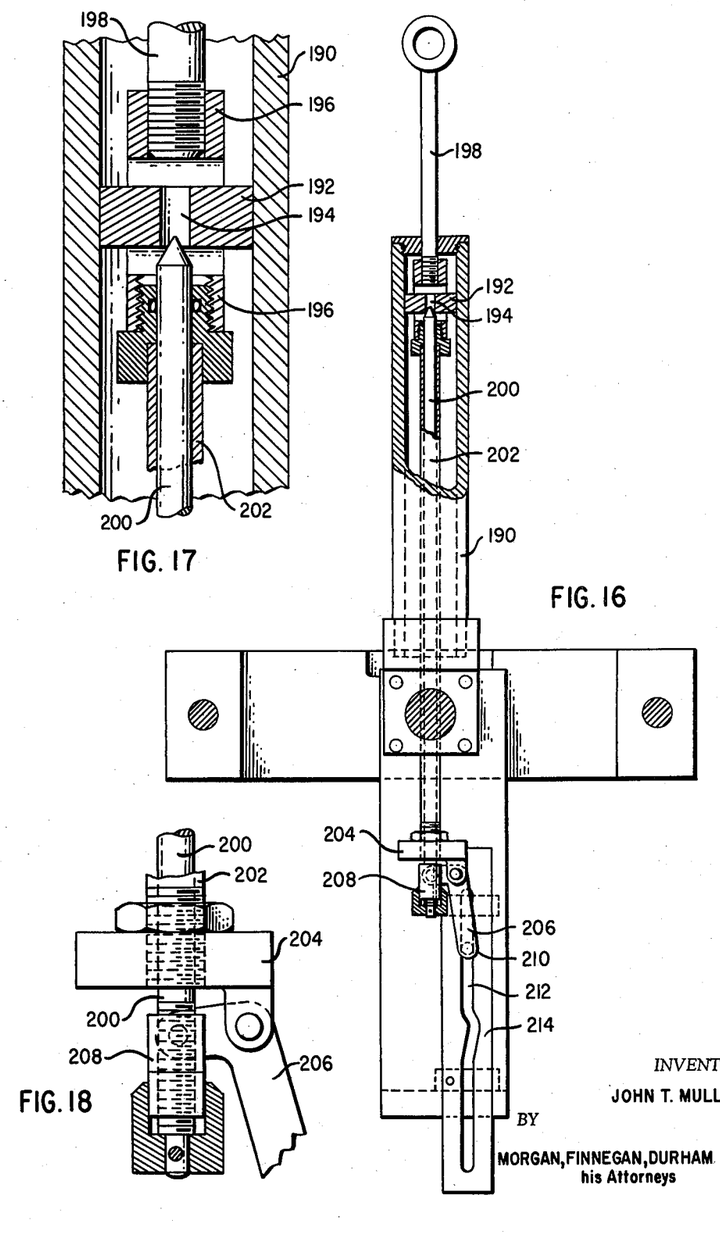
FIG. 16 is an elevational view partly in section showing the damping means employed by applicant in his apparatus.
FIG. 17 is an enlarged sectional view of a portion of the apparatus shown in FIG. 16.
FIG. 18 is an enlarged view partly in section of the apparatus shown in FIG. 16.

In order to obtain faithful reproduction of the displacement motion of the cam tracks at the test platform it is necessary that the intervening mechanism be perfectly rigid. Such a condition does not, and cannot, be achieved in practice due to construction details and the inherent elasticity of the materials used in the apparatus. However, satisfactory reproduction of the motion can be achieved by compensating for the errors so introduced. Accordingly, to this end, the applicant provides damping means for the pivotable arm 48. The damping means comprise a long cylinder 190 secured to the frame 10. Residing in cylinder 190 is a slidable piston 192. A central aperture 194 is provided in the piston and suitable mounting flanges 196 are also provided to which there are secured a ring bolt 198 and a long needle-nosed rod 200. Ring bolt 198 extends from the top of the cylinder 190 and is secured to the arm 48 so as to be movable therewith. The rod 200 is mounted within a hollow tube 202 and with the tube is secured to a device for relatively moving the rod 200 with respect to the tube 202. This device comprises a flange 204 mounted on the outside of the tube to which there is pivotally attached a bell crank 206. One end of the bell crank is adjustably secured, by means of a threaded nut 208, to the rod 200. The opposite end 210 of the bell crank is mounted within a cam track 212 cut in a bracket 214 fixed to the frame. The cam track may be any desired configuration and may be made so as to be interchangeable.

As the pivotable arm 48 is moved downwardly the piston 192 is moved downwardly in the cylinder 190 which is full of oil or some other hydraulic fluid. As the piston moves downwardly oil on the downward side passes through the central aperture 194 into the upper portion of the cylinder. The flow of the oil or hydraulic fluid through the aperture 194 is governed by the position of the needle-nosed rod 200. At the proper time in the cycle the bell crank is moved by the cam track 212 so as to withdraw the needle-nosed rod 200 from adjacent the aperture 194 and the movement of the pivotable arm 48 in this portion of the stroke is not damped. This occurs for the very short period during which the test object is being subjected to the displacement motion.

The invention in its broader aspects is not limited to the specific mechanisms shown and described but departures may be made therefrom within the scope of the accompanying claims without departing from the principles of the invention and without sacrificing its chief advantages.

I claim:

1. Apparatus for transient shock testing of objects comprising data storage means for storing data representative of a desired displacement motion for the test object, a movable supporting surface to which the test object is secured, motion translating means connected between said storage means and the supporting surface for the test object, kinetic energy storage means connected to the motion translating means, control means responsive to a control movement for releasing the energy stored in said energy storage means to actuate the motion translating means in accordance with variations in the stored data to convert said displacement motion into movement of the supporting surface for the test object and timing means included in said control means for automatically terminating the release of energy from said energy storage means after a predetermined time interval of predetermined duration.

2. Apparatus as set forth in claim 1 having viscous damping means connected to the supporting surface for the test object for providing compensation for lags in the action of the motion translating and control means.

3. Apparatus as set forth in claim 1 in which said data storage means comprise a cam track of required configuration and said motion translating means have a cam follower in engagement with the cam track.

4. Apparatus as set forth in claim 3 in which the energy storage means comprise a rotary fly wheel.

5. Apparatus as set forth in claim 4 in which said cam track is cut in said rotary fly wheel.

6. Apparatus for shock testing objects comprising a rotary fly wheel having a cam track formed therein, the eccentricity of which defines the instantaneous displacement motion of a test object, a shaft mounted for rotary and longitudinal movement, tracking means on said shaft in engagement with the cam track whereby rotation of the fly wheel results in rotation of the shaft, a supporting surface for the test object mounted at the end of a pivotable arm, a clutch connected to said arm and said shaft, and control means for imparting longitudinal displacement to the shaft to thereby cause engagement of said clutch whereby rotary movement of the shaft is translated into substantially unidirectional movement of the supporting surface.

7. Apparatus as set forth in claim 6 having viscous damping means secured to the pivotable arm for compensating for lags in the motion of said pivotable arm.

8. Apparatus as set forth in claim 7 in which the damping means may be variably controlled during the stroke of the pivotable arm.

9. A method of applying a transient shock impulse to a test object, said transient shock impulse representing an acceleration of said test object over a discrete, non-periodic time interval, comprising the step of applying a displacement independent of the mass and weight of said test object to said test object over a non-periodic time interval and controlling at least a part of said displacement in accordance with the second integral with respect to time of said transient shock impulse.

10. A method of applying a transient shock impulse to a test object, said transient shock impulse representing an acceleration of said test object over a discrete, non-periodic time interval, comprising the steps of applying displacements independent of the mass and weight of said test object successively to said test object over a non-periodic time interval and controlling one of said displacements in accordance with the second integral with respect to time of said transient shock impulse.

11. A method according to claim 10 in which another of said displacements is the second integral of an impulse required to bring said object to rest at the termination of said transient.

12. A method of applying a transient shock impulse to a test object, said transient shock impulse comprising an acceleration of said test object which varies as a complex function of time over a discrete, non-periodic time interval, comprising the steps of successively applying displacements independent of the mass and weight of said test object to said test object over a non-periodic time interval and controlling one of said displacements in accordance with the second integral with respect to time of said complex variable acceleration.

13. A method of applying a transient shock impulse to a test object, said transient shock impulse comprising an acceleration of said test object which varies in accordance with a trigonometric function of time over a discrete, non-periodic time interval, comprising the steps of applying displacements independent of the mass and weight of said test object successively to said test object over a non-periodic time interval and controlling one said displacement in accordance with the second integral with respect to time of said transient shock impulse.

14. A method of applying a transient shock impulse to a test object, said transient shock impulse representing an acceleration of said test object over a discrete, non-periodic time interval, comprising the steps of applying displacements independent of the mass and weight of said test object successively to said test object over a non-periodic time interval, controlling one of said displacements in accordance with the second integral with respect to time of said transient shock impulse, and controlling the other displacement in accordance with the second integral with respect to time of a deceleration impulse representing an arbitrary function of time.

15. A method of applying a transient shock impulse to a test object, said transient shock impulse representing an acceleration of said test object over a discrete, non-periodic time interval, comprising subjecting the test object to a predetermined displacement independent of the mass and weight of said test object, controlling the variation with respect to time of said displacement in accordance with the second time integral of the desired shock impulse and the second time integrals of two arbitrary acceleration impulses oppositely directed with respect to said shock impulse, and controlling said arbitrary impulses to have lesser intensity and longer time duration than said shock impulse and to have a total energy equal to the energy of the shock impulse.

16. A method of applying shock impulses to a test object comprising subjecting said object to a displacement motion independent of the mass and weight of said test object which has a complex variation with respect to time, said complex variation being characterized as a composite variation consisting of a fundamental sinusoidal variation and a plurality of harmonics of said fundamental sinusoidal variation and controlling at least a part of said displacement in accordance with the second integral with respect to time of said shock impulses.

17. Apparatus for applying a transient shock to an object comprising data storage means, the data representing motions to be imparted to said object, object displacement means for imparting motions to said object independent of the mass and weight thereof, program means including timed control means operable in response to a control action to render said object displacement means responsive to said data storage means and means operable after a predetermined time interval to automatically de-activate said timed control means thereby isolating said object displacement means from said data storage means.

18. Apparatus for applying a transient shock to an object comprising data storage means, said data representing a sequence of the instantaneous amplitudes of displacement to be imparted to said object, object displacement means for imparting motions to said object independent of the mass and weight thereof, program means including timed control means operable in response to a control action to render said object displacement means responsive to said data storage means and means operable after a predetermined time interval to automatically de-activate said timed control means thereby isolating said object displacement means from said data storage means.

19. Apparatus for applying a transient shock to an object comprising data storage means in the form of a cam track, the eccentricity of said track representing the instantaneous displacement to the imparted to said object, object displacement means for imparting transient motions to said object independent of the mass and weight thereof comprising a platform secured to a lever arm, program means including timed mechanical control means operable in response to a control action to render said object displacement means responsive to said data storage means and cam-linkage means operable after a predetermined time interval to automatically de-activate said timed control means thereby isolating said object displacement means from said data storage means.

References Cited in the file of this patent

UNITED STATES PATENTS

| | | |
|---|---|---|
| 2,070,633 | Topham | Feb. 16, 1937 |
| 2,301,967 | Nosker et al. | Nov. 17, 1942 |
| 2,396,620 | | |
| 2,438,755 | | |
| 2,692,509 | Gibson | Oct. 26, 1954 |
| 2,745,517 | Zook | May 15, 1956 |
| 2,767,573 | De Vost et al. | Oct. 23, 1956 |
| 2,809,514 | Corocoran | Oct. 15, 1957 |
| 2,953,030 | Replogle et al. | Sept. 20, 1960 |
| 2,396,620 | Taxwood | Mar. 12, 1946 |
| 2,438,755 | Larsen | Mar. 30, 1948 |